United States Patent
Benjelloun Mlayah et al.

(10) Patent No.: US 12,077,613 B2
(45) Date of Patent: Sep. 3, 2024

(54) METHOD OF PRODUCTION OF LIGNIN AND HEMICELLULOSE FROM A PLANT LIGNOCELLULOSIC MATERIAL

(71) Applicant: COMPAGNIE INDUSTRIELLE DE LA MATIERE VEGETALE—CIMV, Neuilly sur Seine (FR)

(72) Inventors: Bouchra Benjelloun Mlayah, Pompertuzat (FR); Michel Delmas, Auzeville-Tolosane (FR)

(73) Assignee: Compagnie Industrielle de la Matiere Vegetale—CIMV, Neuilly sur Seine (FR)

( * ) Notice: Subject to any disclaimer, the term of this patent is extended or adjusted under 35 U.S.C. 154(b) by 0 days.

(21) Appl. No.: 16/970,623

(22) PCT Filed: Feb. 19, 2019

(86) PCT No.: PCT/EP2019/054103
§ 371 (c)(1),
(2) Date: Aug. 17, 2020

(87) PCT Pub. No.: WO2019/162277
PCT Pub. Date: Aug. 29, 2019

(65) Prior Publication Data
US 2021/0079123 A1    Mar. 18, 2021

(30) Foreign Application Priority Data
Feb. 20, 2018 (EP) .................................. 18305175

(51) Int. Cl.
C08B 37/00 (2006.01)
C07G 1/00 (2011.01)
C13K 1/02 (2006.01)

(52) U.S. Cl.
CPC ............ C08B 37/0057 (2013.01); C07G 1/00 (2013.01); C13K 1/02 (2013.01)

(58) Field of Classification Search
CPC ..... C08H 8/00; C08L 5/14; C08L 1/00; C08L 97/02; C08L 97/005; C08L 97/00; C08B 37/0003; D21H 11/02; D21H 11/00
(Continued)

(56) References Cited

U.S. PATENT DOCUMENTS

| | | | |
|---|---|---|---|
| 9,719,210 B2 * | 8/2017 | Miettinen | B01J 3/042 |
| 2010/0285553 A1 * | 11/2010 | Delmas | C08H 6/00 |
| | | | 435/162 |
| 2014/0030524 A1 * | 1/2014 | Kadam | C08H 8/00 |
| | | | 530/500 |

FOREIGN PATENT DOCUMENTS

| | | |
|---|---|---|
| EP | 2336195 | 6/2011 |
| WO | WO2017/168051 | 10/2017 |

* cited by examiner

Primary Examiner — Sheng H Davis
Assistant Examiner — Ritu S Shirali
(74) Attorney, Agent, or Firm — Morgan, Lewis & Bockius LLP

(57) ABSTRACT

A method of production of lignin and hemicellulose from a plant lignocellulosic material includes (a) contacting a plant lignocellulosic material with an extraction solution during more than 2 hours at a temperature between 95° ° C. to 110° C., thereby obtaining a solid fraction and a liquid fraction, (b) separating the solid fraction and the liquid fraction, (c) concentrating the liquid fraction so as to obtain a concentrated liquid fraction, (d) mixing equal parts by weight of water with the concentrated liquid fraction so as to obtain a suspension comprising solid particles in suspension in a liquid medium, (e) separating the particles and the medium of the suspension, (f) recovering the particles of the suspension thereby obtaining a fraction comprising lignin called (Continued)

lignified fraction, (g) recovering the medium of the suspension thereby obtaining a fraction comprising hemicellulose called hemicellulosic fraction.

7 Claims, 1 Drawing Sheet

(58) Field of Classification Search
USPC .......................................................... 127/37
See application file for complete search history.

METHOD OF PRODUCTION OF LIGNIN AND HEMICELLULOSE FROM A PLANT LIGNOCELLULOSIC MATERIAL

CROSS-REFERENCE TO RELATED APPLICATIONS

This application is a § 371 national phase entry of International Application No. PCT/EP2019/054103, filed Feb. 19, 2019, which claims priority to European Patent Application No. 18305175.4, filed Feb. 20, 2018.

FIELD OF THE INVENTION

The present invention relates to a method of production of lignin and hemicellulose from a plant lignocellulosic material and to the lignin and the hemicellulose produced by this method.

BACKGROUND OF THE INVENTION

Lignocellulosic material industry has become green, possible alternative of fossil resources. This type of material is the most abundantly available biopolymer in nature with a production of about $1.3 \times 10^{10}$ metric tons per year.

Lignocellulose is a generic term that denotes the natural composite material that gives shape and structure to plants. It is the combination of three natural biopolymers, which are:

- cellulose, which is a stereoregular polysaccharide resulting from the polymerization of D-glucose to β-1,4-glucose;
- lignins, which are polyphenols resulting from the polymerization of phenolic allyl alcohols; and
- hemicelluloses, which are polysaccharides resulting from the polymerization of sugars having five carbon atoms such as xylose and arabinose and/or having six carbon atoms such as glucose and mannose.

The proportion and the distribution of the various sugars depend on the plant in question. Thus, the hemicelluloses of annual plants and of hardwoods have, in a very large proportion, xylose as the main monomer, whereas the main monomer of hemicelluloses of softwoods is mannose.

Lignocellulosic material may be converted into various derivatives such as paper, biofuels, chemicals etc.

Lignocellulose confers the hydrolytic stability and structural robustness to the cell walls of the plants and is highly resistant degradation. This robustness or "recalcitrance" is attributable to the crosslinking between the cellulose and hemicellulose and the lignin via ester and ether linkages. To produce lignocellulose derivatives, it is first necessary to fractionate this material into reactive intermediates such as cellulose, hemicellulose and lignin.

However, the methods of treatment of the lignocellulosic material often favour one of these intermediates at the detriment of the others leading to a global yield of this treatment which is ecologically and economically insufficient. In particular, cellulose which is the most common by-product of lignocellulosic material is often privileged over hemicellulose and lignin and the known methods of treatment of the lignocellulosic material produce a poor yield and/or a poor quality of lignin or hemicellulose.

For example, some treatments of lignocellulosic material are carried out by contacting this material with an alkaline solution comprising sodium hydroxide or calcium hydroxide. However, this alkaline method alters the lignin and hemicellulose.

The treatment may also comprise an acid extraction step for example with sulfuric acid or phosphoric acid. These acids are very corrosive to reactor.

Furthermore, this acid extraction step forms unintended by-products and leads to an uncontrolled hydrolysis process.

One alternative is the use of formic acid or a mixture of formic acid and acetic acid. This method is disclosed in the patent application WO00/68494 of Compagnie Industrielle de la Matière Végétale (CIMV). Although this method enables to obtain intermediates of higher quality, it remains highly corrosive to reactor and the global efficiency of the method could be further improved.

In view of the foregoing, there is still a need for a method for treatment of a plant lignocellulosic material in order to obtain high yield of intermediates such as hemicellulose and/or lignin with a good quality and which may be easily converted into final lignocellulosic derivatives.

SUMMARY OF THE INVENTION

Now, the applicant has found that by using a given ratio of acetic acid, formic acid and water, the quality of lignin and hemicellulose was increased and the yield of extracted hemicellulose and lignin remains high. Thus, the lignins obtained are linear, non-recombined, low molecular weight. Hemicellulose is also of very high quality with very low concentration of furfural and of high added value.

A subject of the present invention is therefore a method of production of lignin and hemicellulose from a plant lignocellulosic material comprising the steps of:

(a) contacting a plant lignocellulosic material with an extraction solution comprising:
- acetic acid in an amount of 40% to 70% by weight,
- formic acid in an amount of 20% to 50% by weight and
- water in an amount of 15% to 25% by weight, during more than 2 hours at a temperature between 95° C. to 110° C., thereby obtaining a solid fraction and a liquid fraction, (b) separating the solid fraction and the liquid fraction, (c) concentrating the liquid fraction so as to obtain a concentrated liquid fraction comprising dry matter in a proportion of between 60% and 70% by weight, (d) mixing equal parts by weight of water with the concentrated liquid fraction at a temperature between 50° C. and 60° C. so as to obtain a suspension comprising solid particles in suspension in a liquid medium, (e) separating the particles and the medium of said suspension, (f) recovering the particles of said suspension thereby obtaining a fraction comprising lignin called lignified fraction, (g) recovering the medium of said suspension thereby obtaining a fraction comprising hemicellulose called hemicellulosic fraction.

The method of the invention is particularly well adapted for high scale production. The low concentration of formic acid prevents the corrosion of the reactor. Furthermore, due to the specific ratio of the extraction solution, the temperature of the extraction step is fare greater than the self ignition temperature. Therefore, the risk of an explosion is avoided.

As for the concentration of water, it is a key feature for the overall yield of the method. Indeed, at constant rate of formic acid, the yield of the extraction step varies strongly depending on the water rate. When the percentage by weight of water is lower to the optimal percentage, it remains a higher concentration of residual lignin in the solid fraction is high. But if the percentage by weight of water is higher to the optimal percentage the residual lignin in the solid fraction is also high. Thus, due to some properties of lignin, the method of the invention enables a high yield of separation of lignin because of its specific water concentration range of water.

Moreover, lignocellulose treated with the method of the invention does not generate unintended by-products such as furfural in the liquid fraction.

DETAILED DESCRIPTION OF THE INVENTION

Method of Production of Lignin and Hemicellulose from a Plant Lignocellulosic Material The plant lignocellulosic material may for example come from annual plants. The expression "annual plant" is understood to mean any plant having a vegetative life of the order of one year. Annual plant may be for example cereal, cotton, hemp, flax, sugar cane, sorghum or reed.

The lignocellulosic plant material may be the whole plant, part of these plants such as for example stem, or co-products from industrial processes aimed at the production of foods such as for example straw or bagasse. Cereal straw may be wheat, barley, rye, oats, triticale or rice straw. Bagasse may be sugar cane bagasse or sugar sorghum bagasse.

The method of the invention is suitable to treat all of these kinds of plant lignocellulosic materials even if these plant lignocellulosic materials present very different proportions and distributions of cellulose, hemicellulose and lignin. In particular, the process makes possible particularly valuable economic utilisation of straw and bagasse which are considered as products of the second category without great value.

In one embodiment, the step (a) of contacting the plant lignocellulosic material with an extraction solution, also called hereinafter extraction step, is preceded by a step of grinding the plant lignocellulosic material so as to reduce it to fragments, for example, to fragments with a length substantially of between 0.5 and 20 cm. Before the extraction step (a), it is also possible to carry out a preimpregnation of the plant lignocellulosic material with a solution comprising formic acid and acetic acid, preferably the extraction solution of the invention. The impregnation may be carried out at a temperature between 65° C. and 80° C. The impregnation by immersion can be carried out for a period of time of 10 min to 30 min.

The first step of the method of production of lignin and hemicellulose from a plant lignocellulosic material of the invention is the step (a) of contacting a plant lignocellulosic material with an extraction solution comprising:
  acetic acid in an amount of 40% to 70% by weight,
  formic acid in an amount of 20% to 50% by weight and
  water in an amount of 15% to 25% by weight,
during more than 2 hours at a temperature between 95° C. to 110° C., thereby obtaining a solid fraction and a liquid fraction.

In one embodiment, the extraction solution comprises:
  acetic acid in an amount of 40% to 70% by weight,
  formic acid in an amount of 20% to 50% by weight and
  water in an amount of 15% to 25% by weight
with the proviso the extraction solution does not comprise acetic acid in an amount of 55%, formic acid in an amount of 30% and water in an amount of 15%.

Preferably, the extraction solution comprises acetic acid in an amount of 50% to 60% by weight, more preferably 52.5% to 57.5%.

Preferably, the extraction solution comprises formic acid in an amount of 25% to 35% by weight, more preferably 27.5% to 32.5%.

Preferably, the extraction solution comprises water in an amount of 15% to 20% by weight, more preferably 15% to 17.5%, most preferably 15% to 16%.

In a preferred embodiment, the extraction solution comprises:
  acetic acid in an amount of 50% to 60% by weight,
  formic acid in an amount of 25% to 35% by weight and
  water in an amount of 15% to 20% by weight In a preferred embodiment, the extraction solution consists of acetic acid, formic acid and water. In this embodiment, the presence of any additional component in the extraction solution is excluded.

Typically, the extraction step (a) is carried out at atmospheric pressure.

In a preferred embodiment, the duration of extraction step (a) is greater than 2.5 hours. Indeed, contrary to prior art method with acetic acid and formic acid, the method of the invention is softer and its duration needs to be greater than 2 hours in order to produce a maximal yield of high quality intermediates. More preferably, the duration of extraction step (a) is between 3 hours and 4 hours, most preferably between 3 hours and 3.5 hours. This preferred range of duration enables a production of a maximal yield of intermediates without degrading the lignins and hemicellulose. This range of duration also enables a better selectivity in the hydrolysis of the polysaccharides. Furthermore, an extraction step (a) of 3 to 3.5 hours provides lignin and hemicellulose of high quality.

The solid fraction comprises cellulose whereas the liquid fraction comprises lignin and hemicellulose.

Thus, the method of the invention comprises a step (b) of separating the solid fraction and the liquid fraction. This step enables the separation of lignin and hemicellulose from cellulose. The method of the invention is particularly efficient in providing a high yield of the intermediates of interest in the liquid fraction i.e. hemicellulose and lignin.

Further to the step (c), the liquid fraction is concentrated so as to obtain a concentrated liquid fraction comprising dry matter in a proportion of between 60% and 70% by weight, preferably 65% by weight. In a preferred embodiment, the step (c) of concentrating the liquid fraction is carried out by evaporation.

Then in a step (d), water is mixed in equal parts by weight of water with the concentrated liquid fraction at a temperature at a temperature between 50° C. and 60° C., preferably at 55° ° C., so as to obtain a suspension comprising solid particles in suspension in a liquid medium.

The obtained suspension is stable.

In an embodiment, the concentrated liquid fraction is introduced in the water.

In an embodiment the mixing is carried out by rotating.

Preferably the step (d) of mixing water with the concentrated liquid fraction is carried out in a continuous mode. A disperser may be continuously fed with water and concentrated liquid where they are continuously mixed. The continuous mode enables to a high stability and homogeneity of the suspension. In particular the homogeneity of the size of the solid particles and the stability are better than when the dispersion is carried out in a batch mode.

When a process is in a batch mode, it means that the material to be processed is processed by successive batches i.e. the flow of the material to be processed is sequential (batch by batch).

When a process is in a continuous mode, it means that the material to be processed is processed continuously i.e. the flow of material to be processed and of the product is continuous.

In the embodiment of the invention where the step (d) of mixing water with the concentrated liquid fraction is carried out in a batch mode, a defined quantity of water and concentrated liquid fraction are mixed for example in a stirred reactor.

In the embodiment of the invention where the step (d) of mixing water with the concentrated liquid fraction is carried out in a continuous mode, the water and the concentrated liquid fraction are mixed continuously for example with a disperser, to produce a suspension of lignin particles. As mentioned above, it results from the continuous mode that the produced lignin particles have an improved stability and size homogeneity.

The particles and the medium of said suspension are separated. This separation is preferably carried out by filtration for example using a filter press. Then, the method of the invention may comprise a step of washing the particles of the suspension which has been separated from the medium of the suspension with an aqueous solution. Preferably, the acid concentration of the aqueous solution is lower than 2% of acid by weight. The aqueous solution is preferably water.

In one embodiment, the step (e) of separating the particles and the medium of the suspension comprises the steps of:
(1) filtrating the suspension so as to obtain a filter cake and a filtrate,
(2) recovering the filtrate,
(3) mixing at least one part of the cake with an aqueous solution so as to obtain a dispersion comprising dispersed particles in suspension in a continuous phase,
(4) filtrating the dispersion obtained at step (3) so as to obtain a cake and a filtrate;
(5) repeating the steps (2) to (4) at least once,
(6) recovering the cake.

In a preferred embodiment, at step (3) all the cake is mixed with the aqueous solution.

The filtrate(s) comprise(s) hemicellulose and the cake(s) comprise(s) lignin. Thus, the washing of the cake with an aqueous solution enables to recover high yield of hemicellulose. The cake recovered at step (6) comprises a high quality lignin. Moreover, the washing of the cake lowers its acidity.

In a preferred embodiment, the step (e) of separating the particles and the medium of the suspension comprises the steps of:
(1') filtrating the suspension so as to obtain a first cake and a first filtrate,
(2') recovering the first filtrate,
(3') mixing at least one part of, preferably all, the first cake with a first aqueous solution so as to obtain a first dispersion comprising dispersed particles in suspension in a continuous phase,
(4') filtrating the obtained first dispersion so as to obtain a second cake and a second filtrate;
(2") recovering the second filtrate,
(3") mixing at least one part of, preferably all, the second cake with a second aqueous solution so as to obtain a second dispersion comprising dispersed particles in suspension in a continuous phase,
(4") filtrating the obtained second dispersion so as to obtain a third cake and a third filtrate;
(2''') recovering the third filtrate,
(3''') mixing at least one part of, preferably all, the third cake with a third aqueous solution so as to obtain a third dispersion,
(4''') filtrating the obtained third dispersion so as to obtain a fourth cake and a fourth filtrate;
(6') recovering the fourth cake.

The first aqueous solution may be the third filtrate. Thus, step (3') may be the mixing of at least one part of, preferably all, the first cake with the third filtrate so as to obtain a first dispersion comprising dispersed particles in suspension in a continuous phase The second and the third aqueous solutions may be water.

Once separated from the medium (filtrate when medium and particles of the suspension are separated by filtration), the particles (cake when medium and particles of the suspension are separated by filtration) which comprise lignin may be dried in order to obtain lignin as powder; preferably the size of the particles of this powder is between 20 and 50 microns.

The lignin thus obtained has la molecular of less than 2000 g/mol. Moreover, the lignin thus obtained comprises available functional groups chosen from the group made up of aliphatic hydroxyls, phenolic hydroxyls and carboxylic acids.

Thus the present invention also relates to lignin produced by the method of the invention which has a molecular weight of less than 2000 g/mol and/or with available functional groups chosen from the group made up of aliphatic hydroxyls, phenolic hydroxyls and carboxylic acids.

The method of the invention also enables to produce hemicellulose with a high purity rate. In particular the hemicellulose thus obtained has a furfural rate of less than 0.1% and/or a lignin rate of less than 3%.

Consequently, the present invention also relates to hemicellulose produced by the method of the invention which has a furfural rate of less than 1% and/or a lignin rate of less than 3%.

The high purity of the hemicellulose produced by the method of production of lignin and hemicellulose of the invention makes it an ideal intermediate for production of sugars.

Therefore, the present invention also relates to a method for producing sugars comprising the steps of:
(γ) producing hemicellulose and lignin according to the method of the invention,
(δ) hydrolysis of the hemicellulosic fraction recovered at step (g).

The hydrolysis may be an enzymatic or a chemical hydrolysis. For example, the hydrolysis may be conducted at 50° C. to 55° C. for 48 h to 72 h. The hydrolysis may use an enzyme mixture, for example a mixture comprising cellulase and xylanase.

The sugars obtained by the method of the invention may be further converted in various sugar derivatives such as alcohol.

The method of invention may also be used to produce cellulose in addition to lignin and hemicellulose. This method is particularly interesting because it enables producing the main three intermediates: lignin, hemicellulose and cellulose from a plant lignocellulosic material with a high yield and high quality for each of these intermediates.

The cellulose may be produced in the form of raw cellulose pulp or of delignified cellulose pulp.

Thus, in one embodiment, the method of the invention comprises the step of recovering the solid fraction obtained at step (b) so as to obtain cellulose pulp, called raw cellulose pulp. The yield of raw cellulose obtained by the method of the invention is high. Furthermore, the raw cellulose pulp thus obtained has a low rate of residual lignin and residual hemicellulose and its polymerization degree is high.

The present invention also relates to raw cellulose pulp produced by the method as defined above which has:

a rate of residual lignin of 5% to 6.5% and a polymerization degree of the cellulose of 1200 to 1500.

In another embodiment, the method comprises a delignification step comprising:

(α) contacting the solid fraction obtained at step (b) with an acid delignification solution comprising peracetic acid and performic acid, thereby obtaining a solid phase called delignified solid phase and a liquid phase called lignified liquid phase, (β) separating the delignified solid phase and the lignified liquid phase. The present invention also relates to delignified cellulose pulp produced by the method as defined above which has:

a rate of residual lignin of 2% to 2.5% and a polymerization degree of the cellulose of 1000 to 1200.

The delignification step is particularly advantageous because it may remain residual lignin in the solid fraction after the extraction step (a). Therefore, it is preferred to add a delignification step in order to remove this residual lignin, in particular when the cellulose pulp must be used to produce sugars or sugar derivatives such as ethanol.

The performic and peracetic acid of the delignification solution are potent oxidizing agents. They carry out the degradation and solubilisation of the residual lignins present in the solid fraction.

This reaction is very selective for lignins. It is without any effect on the cellulose. In particular, the degree of polymerization of the cellulose is not affected.

Preferably, the delignification solution comprises water of less than or equal to 15% by weight. Indeed, the mixture of performic acid and peracetic acid containing little water enabled a particularly efficient degradation of the cellulose in a single step without degradation of the cellulose fibres.

In a preferred embodiment, the peracetic acid and the performic acid are obtained by bringing a solution comprising acetic acid and formic acid into contact with hydrogen peroxide. Preferably hydrogen peroxide has a concentration comprised between 30% and 50% by weight.

The invention will be further illustrated by the following figures and examples. However, these examples should not be interpreted in any way as limiting the scope of the present invention.

BRIEF DESCRIPTION OF THE FIGURES

The FIG. 1 shows the particle size dispersion for a suspension obtained in a batch mode.

The FIG. 2 shows the particle size dispersion for a suspension obtained in a continuous mode.

EXAMPLES

Figure 1:
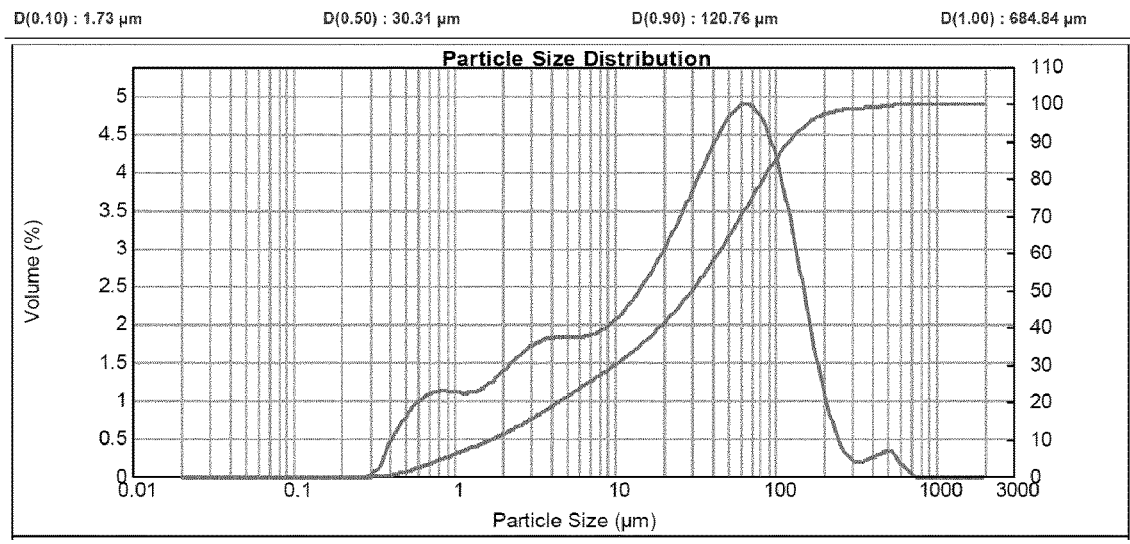

Example 1—Effect of the Percentage of Formic Acid on the Efficiency of the Extraction for an Extraction Step of 1 Hour

| | Percentage of acetic acid/formic acid/water in the extraction solution | | | |
|---|---|---|---|---|
| | 25/60/15 | 30/55/15 | 55/30/15 | 75/10/15 |
| Yield of extracted matter (lignin + hemicellulose) | 44% | 42% | 35% | 20% |

The yield of extracted matter corresponds to the ratio of the extracted weight/weight of the biomass. These results show that the more is the percentage of formic acid, the higher is the extraction yield.

Example 2—Effect of the Percentage of Formic Acid on the Quality of the Produced Intermediates

| | Percentage of acetic acid/formic acid/water in the extraction solution | | | |
|---|---|---|---|---|
| | 25/60/15 | 30/55/15 | 55/30/15 | 75/10/15 |
| Molecular weight of the extracted lignin (g/mol) | 4050 | 2900 | 1700 | 1680 |

These results show that the more is the percentage of formic acid, the higher is the molecular weight of produced lignin. The formic acid leads the recombination of the fragments of extracted lignin and consequently lowers its reactivity.

Example 3—Effect of the Duration of the Extraction Step

In order to compensate the deleterious effect of the formic acid on the quality of the lignin, a longer duration of the extraction step has been tested.

With an extraction of 55% of acetic acid, 30% of formic acid and 15% of water, an optimal extraction yield (49% lignin+hemicellulose comprising 25% of lignin and 24% of hemicellulose) is obtained as well as a high quality of lignin (Mw=1950 g/mol)

When the extraction solution comprises a low percentage of formic acid, an increase in the duration of the extraction step enables an increase in the rate of extraction.

Moreover, there is no significant effect of the increase in the duration of the extraction step on the functional groups of lignin.

| | | Phenolic OH (mmol/g) | | | | |
|---|---|---|---|---|---|---|
| | Aliphatic OH (mmol/g) | H Units | G Units | S Units | 4-O-5' cond. Units | —COOH (mmol/g) |
| 1 h | 2.37 | 0.37 | 0.60 | 0.28 | 0.14 | 0.38 |
| 3 h30 | 2.12 | 0.37 | 0.59 | 0.35 | 0.15 | 0.38 |

When the extraction solution comprises a high percentage of formic acid and the duration of the extraction step is increased, the pentoses of hemicellulose are degraded in furfural.

Example 4—Effects of the Water/Concentrated Liquid Fraction Ratio and of the Batch or Continuous Mode on the Suspension Obtained at Step (d)

The size of particles and the homogeneity of the suspension obtained by mixing the concentrated liquid fraction and the water (step (d)) have been tested with mixing carried out in batch or continuous mode and with various water/concentrated liquid fraction ratio ($R_{water/liquid\ fraction}$). The ratios $R_{water/liquid\ fraction}=1$ (SM in suspension 30%), 0.8 (SM in suspension=33.3%) and 0.6 (SM in suspension 37.5%) have been tested.

For each experiment at the continuous mode, the speed of the disperser was 8000 rpm.

The size of the particles in the suspension have been determined with a Turbiscan™ (light retrodiffusion).

With all the tested water/concentrated liquid fraction ratios, the profile corresponds to a homogeneous dispersion. However, with $R_{water/liquid\ fraction}=1$ the size of the particles is slightly smaller. The percentage of retrodiffusion is 20% whereas this percentage is 18% for $R_{water/liquid\ fraction}=0.8$ and for $R_{water/liquid\ fraction}=0.6$.

Figure 2:
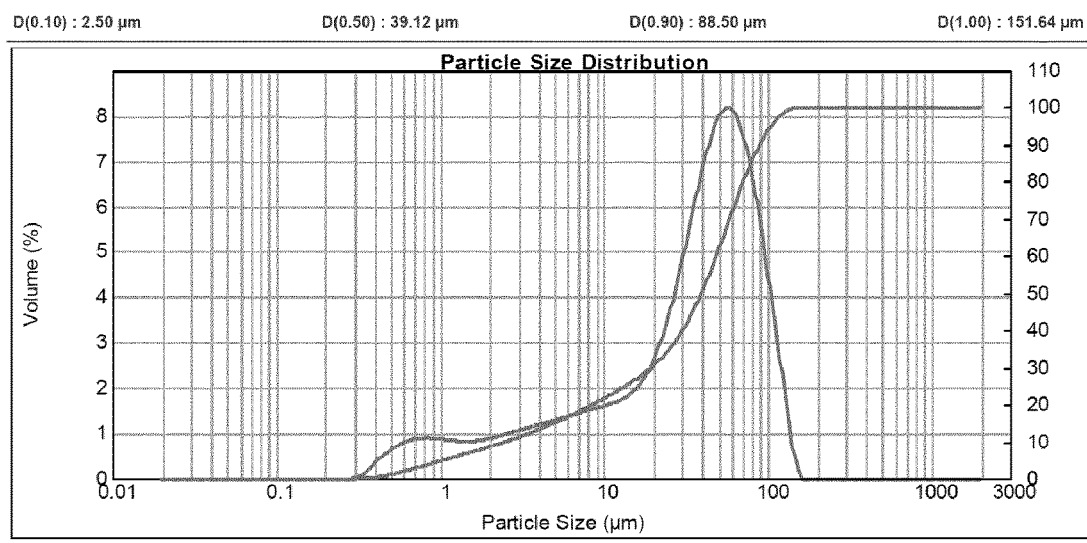

A granulometry laser analysis has been done on suspensions obtained with batch or continuous mode (respectively FIGS. 1 and 2). The results show that the particles are smaller in continuous mode. Moreover, the suspension is much more homogeneous with the continuous mode than with the batch mode.

Example 5—Effect of the Water Concentration in the Step (a)

During step (a) of contacting a plant lignocelllulosic material with an extraction solution, the rate of residual lignin decreases when the amount of water in the extraction solution increases until the amount of water reaches 20% by weight. Above 20% of water by weight in the extraction solution, the rate of residual lignin in the solid fraction slightly increases, probably because of the solubility of the lignin which decreases when the percentage of water in a medium increase. The percentage of hemicellulose in the solid fraction decreases when the amount of water increases: the hemicelluloses are hydrolysed in acid medium and extracted from the biomass.

This indicates that the efficiency of the step (a) increases with the amount of water until the amount of water reaches at least 20%.

For a given amount of formic acid, the optimal amount of water in the extraction solution is 20% (±5%) by weight and in any case higher than 10%.

| Ratio formic acid/acetic acid/water (% by weight) | Rate of solid fraction (%) | Rate of residual lignin in solid fraction (%) | Rate of pentosanes (%) |
|---|---|---|---|
| 20/75/5 | 54. | 9.6 | 20 |
| 20/70/10 | 51.0 | 8 | 18.0 |
| 20/60/20 | 48.5 | 7.2 | 17 |
| 20/50/30 | 48.0 | 7.8 | 16.5 |
| 20/40/40 | 47.5 | 8 | 16 |

Example 6—Effect of the Temperature on Step (d)

The step (d) of mixing water with the concentrated liquid fraction must be carried out at a temperature between 50° C. and 60° C. and more preferably around 55° C. Indeed, the concentrated liquid fraction is first concentrated between 60% and 70% by weight of dry matter before precipitating the lignin by adding water. Without the step of concentrating the liquid fraction, the lignin would remain soluble in the acid medium and its precipitation would not be complete.

The concentrated liquid fraction is kept at a temperature between 70° C. and 80° C. to keep the viscosity acceptable (the viscosity of the concentrated liquid fraction is around 325 poises at 30° C. and 15 poises at 70° C.). Then the concentrated liquid fraction is hot mixed to precipitate lignin:

if the temperature of the dispersed mix is lower than 40° C., the dispersion of the lignin is less thin and less homogenous. The lignin aggregates comprise a high rate of residual hemicellulose and the separation by filtration is less efficient.

if the temperature of the mix is between 50° C. and 60° C., the dispersion is optimal: the size of the lignin particles is very homogenous and elementary (no formation of aggregate, size between 2 and 3 μm). This leads to an optimal separation with a very low rate of residual hemicellulose in the lignin (<3%), if the temperature is higher than 65° C., the lignin resulting from the separation is degraded because of its thermic sensitivity. There is also a high risk of hemicelluloses degradation because of the thermo-sensitivity of hemicelluloses as well as a risk of formation of furfural or derivatives thereof.

The invention claimed is:

1. A method of production of lignin and hemicellulose from a plant lignocellulosic material comprising the steps of:
   (a) contacting a plant lignocellulosic material with an extraction solution comprising:
   acetic acid in an amount of 52.5% to 57.5% by weight,
   formic acid in an amount of 27.5% to 32.5% by weight and
   water in an amount of 15% to 17.5% by weight,
   during between 3 hours and 3.5 hours at a temperature between 95° C. to 110° C. at atmospheric pressure, thereby obtaining a solid fraction and a liquid fraction,
   (b) separating the solid fraction and the liquid fraction,
   (c) concentrating the liquid fraction so as to obtain a concentrated liquid fraction comprising dry matter in a proportion of between 60% and 70% by weight,
   (d) mixing in a continuous mode equal parts by weight of water with the concentrated liquid fraction at a temperature between 50° C. and 60° C. so as to obtain a suspension comprising solid particles in suspension in a liquid medium,
   (e) separating the solid particles and the liquid medium of said suspension,
   (f) recovering the solid particles of said suspension thereby obtaining a fraction comprising lignin particles called lignified fraction, and
   (g) recovering the liquid medium of said suspension thereby obtaining a fraction comprising hemicellulose called hemicellulosic fraction.

2. The method according to claim 1 characterized in that the extraction solution consists of said acetic acid, said formic acid and said water.

3. The method according to claim 1 characterized in that the step (c) of concentrating the liquid fraction is carried out by evaporation.

4. The method according to claim 1 characterized in that the step (e) follows directly the step (d).

5. The method according to claim 1 characterized in that the step (e) of separating the solid particles from the liquid medium of the suspension is carried out by filtration.

6. The method according to claim 1 characterized in that it comprises a step of washing the solid particles of the suspension with an aqueous solution.

7. The method according to claim 1 characterized in that the step (e) of separating the solid particles and the liquid medium of the suspension comprises the steps of:
   (1) filtrating the suspension so as to obtain a filter cake and a filtrate,
   (2) recovering the filtrate,
   (3) mixing at least one part of the filter cake with an aqueous solution so as to obtain a dispersion comprising dispersed solid particles in suspension in a continuous phase,
   (4) filtrating the dispersion obtained at step (3) so as to obtain a filter cake and a filtrate;
   (5) repeating the steps (2) to (4) at least once,
   (6) recovering the filter cake.

* * * * *